(12) United States Patent
Taguchi et al.

(10) Patent No.: US 11,521,361 B1
(45) Date of Patent: Dec. 6, 2022

(54) ENVIRONMENT MODEL WITH SURFACES AND PER-SURFACE VOLUMES

(71) Applicant: Meta Platforms Technologies, LLC, Menlo Park, CA (US)

(72) Inventors: Yuichi Taguchi, Los Gatos, CA (US); Fabian Langguth, Zürich (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/365,340

(22) Filed: Jul. 1, 2021

(51) Int. Cl.
*G06T 19/00* (2011.01)
*G06T 15/08* (2011.01)
*G06T 3/40* (2006.01)
*G06T 17/30* (2006.01)

(52) U.S. Cl.
CPC .......... *G06T 19/006* (2013.01); *G06T 3/4038* (2013.01); *G06T 15/08* (2013.01); *G06T 17/30* (2013.01); *G06T 2215/06* (2013.01); *G06T 2219/008* (2013.01)

(58) Field of Classification Search
None
See application file for complete search history.

(56) References Cited

U.S. PATENT DOCUMENTS

| | | | |
|---|---|---|---|
| 2018/0315162 A1* | 11/2018 | Sturm | G06T 15/10 |
| 2020/0226823 A1 | 7/2020 | Stachniak et al. | |
| 2021/0125414 A1 | 4/2021 | Berkebile | |
| 2021/0158608 A1* | 5/2021 | Boggs | G06T 17/005 |

OTHER PUBLICATIONS

International Search Report and Written Opinion for International Application No. PCT/US2022/033338 dated Sep. 6, 2022, 13 pages.
Wikipedia: "Simultaneous Localization and Mapping," Jul. 25, 2017, 7 pages, Retrieved from the Internet: URL https://en.wikipedia.org/w/index.php?title=Simultaneous_localization_and_mapping&oldid=731478358 [Retrieved on Oct. 23, 2017],.

* cited by examiner

*Primary Examiner* — Yingchun He
(74) *Attorney, Agent, or Firm* — Baker Botts L.L.P.

(57) ABSTRACT

In one embodiment, a method includes receiving sensor data of a scene captured using one or more sensors, generating (1) a number of virtual surfaces representing a number of detected planar surfaces in the scene and (2) a point cloud representing detected features of objects in the scene based on the sensor data, assigning each point in the point cloud to one or more of the number of virtual surfaces, generating occupancy volumes for each of the number of virtual surfaces based on the points assigned to the virtual surface, generating a datastore including the number of virtual surfaces, the occupancy volumes of each of the number of virtual surfaces, and a spatial relationship between the number of virtual surfaces, receiving a query, and sending a response to the query, the response including an identified subset of the plurality of virtual surfaces in the datastore that satisfy the query.

20 Claims, 8 Drawing Sheets

ENVIRONMENT MODEL WITH SURFACES AND PER-SURFACE VOLUMES

TECHNICAL FIELD

This disclosure generally relates to artificial-reality systems, and in particular, related to modeling an environment.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for modeling an environment using a plurality of virtual surfaces representing planar surfaces and per-surface three-dimensional volumes. Human-made indoor and outdoor scenes mainly consist of planar surfaces. Other non-planar objects, i.e., details, are typically supported by at least one planar surface (e.g., objects on a desk top, chairs on the floor, and lamps hanging from the ceiling). Thus, a scene may be segmented into a set of virtual surfaces, each having a three-dimensional volume representing details around the planes. With such segmentations, when a mismatch between a stored positional information of a virtual surface and a real-time Simultaneous Localization And Mapping (SLAM) data occurs, the positional information of the plane in relation to a corresponding spatial anchor can be adjusted with light computations since the volume representations are defined relative to the planes.

In particular embodiments, a computing device may receive sensor data of a scene captured using one or more sensors. In particular embodiments, the sensor data may comprise image sensor data or depth sensor data. The computing device may generate a plurality of virtual surfaces representing a plurality of detected planar surfaces in the scene and a point cloud representing detected features of objects in the scene based on the sensor data. To generate the plurality of virtual surfaces, the computing device may detect a plurality of planar surfaces in the scene. In particular embodiments, the computing device may perform a RANdom SAmple Consensus (RANSAC) based plane fitting method on the point cloud representing detected features of objects in the scene to detect the plurality of planar surfaces in the scene. In particular embodiments, the computing device may run a machine-learning algorithm on the received sensor data to detect the plurality of planar surfaces in the scene. In particular embodiments, the computing device may receive a user input indicating each of the plurality of planar surfaces in the scene to detect the plurality of planar surfaces in the scene. The computing device may select a subset of the plurality of planar surfaces satisfying one or more conditions. The one or more conditions may comprise a minimum required size of a planar surface, or a required orientation of a planar surface. The computing device may generate a virtual surface for each planar surface in the subset of the plurality of planar surfaces. The computing device may assign each point in the point cloud to one or more of the plurality of virtual surfaces. The computing device may generate occupancy volumes for each of the plurality of virtual surfaces based on the points assigned to the virtual surface. The occupancy volumes may be defined relative to the virtual surface. The occupancy volumes may be a set of voxels storing values. In particular embodiments, the occupancy volumes may have binary values indicating occupancy. In particular embodiments, the occupancy volumes may have floating point values indicating signed distances. To generate occupancy volumes for a virtual surface, the computing device may determine a number of points in the point cloud that belongs to each block in a three-dimensional volume grid corresponding to a space on top of the virtual surface. The computing device may generate occupancy volumes based on blocks determined to have more points in the point cloud than a threshold. In particular embodiments, the computing device may generate occupancy volumes for each virtual surface by performing a Truncated Signed Distance Fields (TSDFs) fusion using a subset of points in the point cloud that are assigned to the virtual surface. The computing device may generate a datastore comprising the plurality of virtual surfaces, the occupancy volumes of each of the plurality of virtual surfaces, and a spatial relationship between the plurality of virtual surfaces. The spatial relationship between the plurality of virtual surfaces may be represented by a scene graph. In particular embodiments, the spatial relationship between the plurality of virtual surfaces may be represented by any suitable data structure including a graph. In particular embodiments, the datastore may further comprise a spatial relationship of each of the plurality of virtual surfaces with a corresponding spatial anchor. In particular embodiments, the computing device may receive a second sensor data of the scene captured using the one or more sensors. The computing device may determine that a spatial relationship of a first virtual surface among the plurality of virtual surfaces with its corresponding spatial anchor in the datastore needs to be updated based on the second sensor data. The computing device may update, in response to the determination, the spatial relationship of the first virtual surface with its corresponding spatial anchor in the datastore. An origin of occupancy volumes of a virtual surface may coincide with an origin of the virtual surface. Thus, positions of first occupancy volumes of the first virtual surface may be adjusted along with the first virtual surface.

In particular embodiments, the computing device may receive a query. The query may comprise one or more conditions for planar surfaces. The one or more conditions for the planar surfaces may comprise size of the planar surfaces, orientation of the planar surfaces, emptiness of the planar surfaces, or semantic information associated with occupancy volumes of virtual surfaces corresponding to the planar surfaces. The computing device may identify a subset of the plurality of virtual surfaces in the datastore that satisfy the one or more conditions in the query. To identify the subset of the plurality of virtual surfaces in the datastore that satisfy the one or more conditions in the query, the computing device may extract geometric properties of occupancy volumes of each of the plurality of virtual surfaces in the datastore. The geometric properties may comprise a plane boundary map, an occupancy classification map, a height map, a three-dimensional mesh representation, or any suitable geometric properties. The computing device may send a response to the query. The response may comprise an identified subset of the plurality of virtual surfaces in the datastore that satisfy the query.

In particular embodiments, the computing device may receive a third sensor data of the scene captured using the one or more sensors. The computing device may generate a second virtual surface representing a detected planar surface in the scene based on the third sensor data, wherein the second virtual surface is not in the datastore. The computing device may assign one or more points in the point cloud to the second virtual surface. The computing device may generate second occupancy volumes for the second virtual surface based on the one or more points assigned to the second virtual surface. The computing device may determine that the second occupancy volumes are identical to third occupancy volumes of a third virtual surface in the datastore. The computing device may determine that the second occupancy volumes are closer to the second virtual surface than the third virtual surface. The computing device may delete the third occupancy volumes from the datastore in response to the determination the second occupancy volumes are closer to the second virtual surface than the third virtual surface. The computing device may add the second virtual surface and the second occupancy volumes of the second virtual surface to the datastore.

In particular embodiments, the computing device may receive a fourth sensor data of the scene captured using the one or more sensors. The computing device may determine that a fourth virtual surface and a fifth virtual surface in the datastore belong to a single planar surface based on the fourth sensor data. The computing device may generate a sixth virtual surface by merging the fourth virtual surface and the fifth virtual surface. The computing device may generate sixth occupancy volumes based on the points assigned to the sixth virtual surface. The computing device may update the datastore by (1) replacing the fourth virtual surface and the fifth virtual surface with the sixth virtual surface and (2) replacing fourth occupancy volumes of the fourth virtual surface and fifth occupancy volumes of the fifth virtual surface with the sixth occupancy volumes of the sixth virtual surface.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
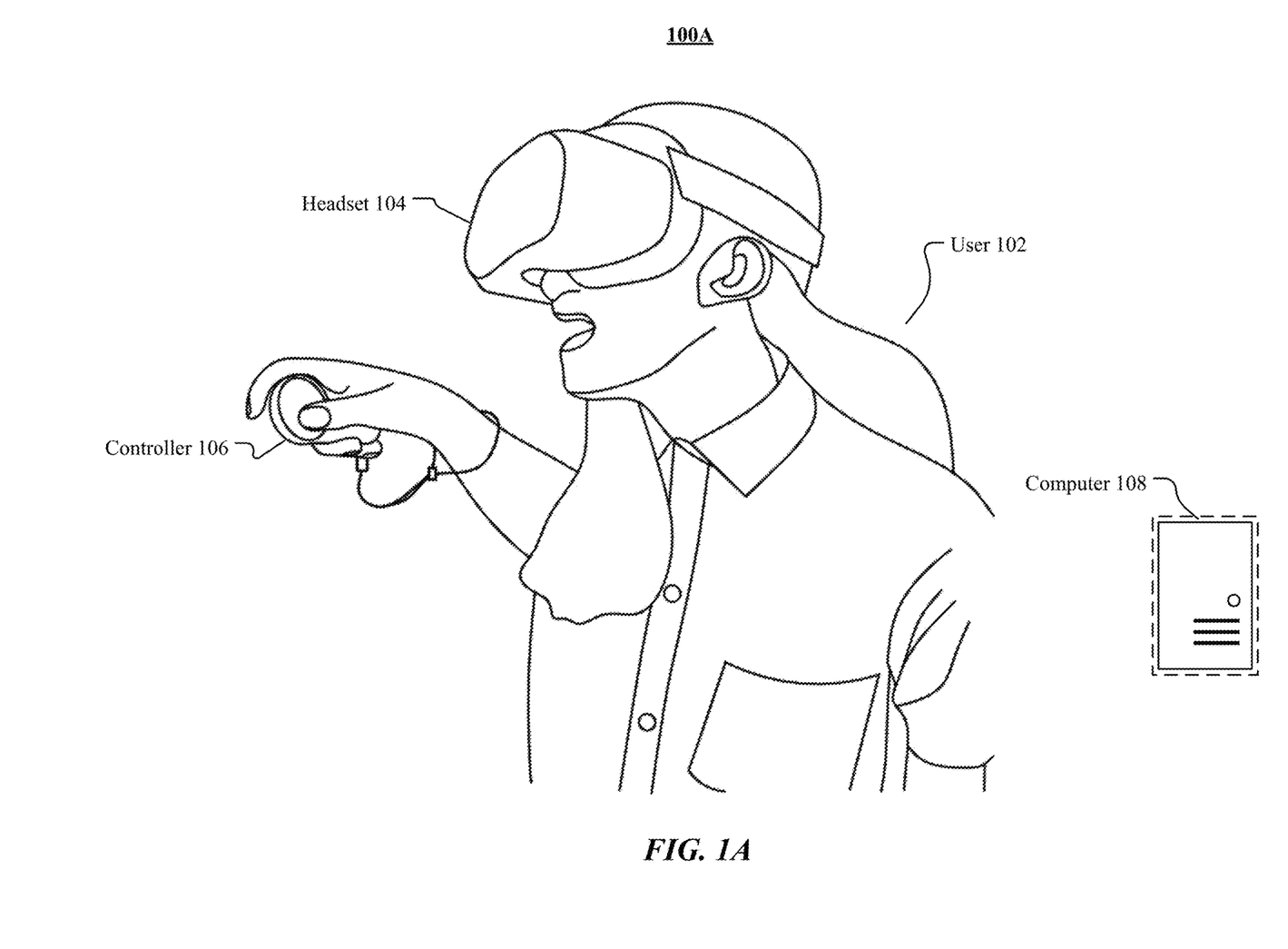
FIG. 1A illustrates an example artificial reality system.

FIG. 1A illustrates an example artificial reality system 100A. In particular embodiments, the artificial reality system 100A may comprise a headset 104, a controller 106, and a computing device 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may include a microphone to capture voice input from the user 102. The headset 104 may be referred as a head-mounted display (HMD). The controller 106 may comprise a trackpad and one or more buttons. The controller 106 may receive inputs from the user 102 and relay the inputs to the computing device 108. The controller 106 may also provide haptic feedback to the user 102. The computing device 108 may be connected to the headset 104 and the controller 106 through cables or wireless connections. The computing device 108 may control the headset 104 and the controller 106 to provide the artificial reality content to and receive inputs from the user 102. The computing device 108 may be a standalone host computing device, an on-board computing device integrated with the headset 104, a mobile device, or any other hardware platform capable of providing artificial reality content to and receiving inputs from the user 102.

Figure 1B:
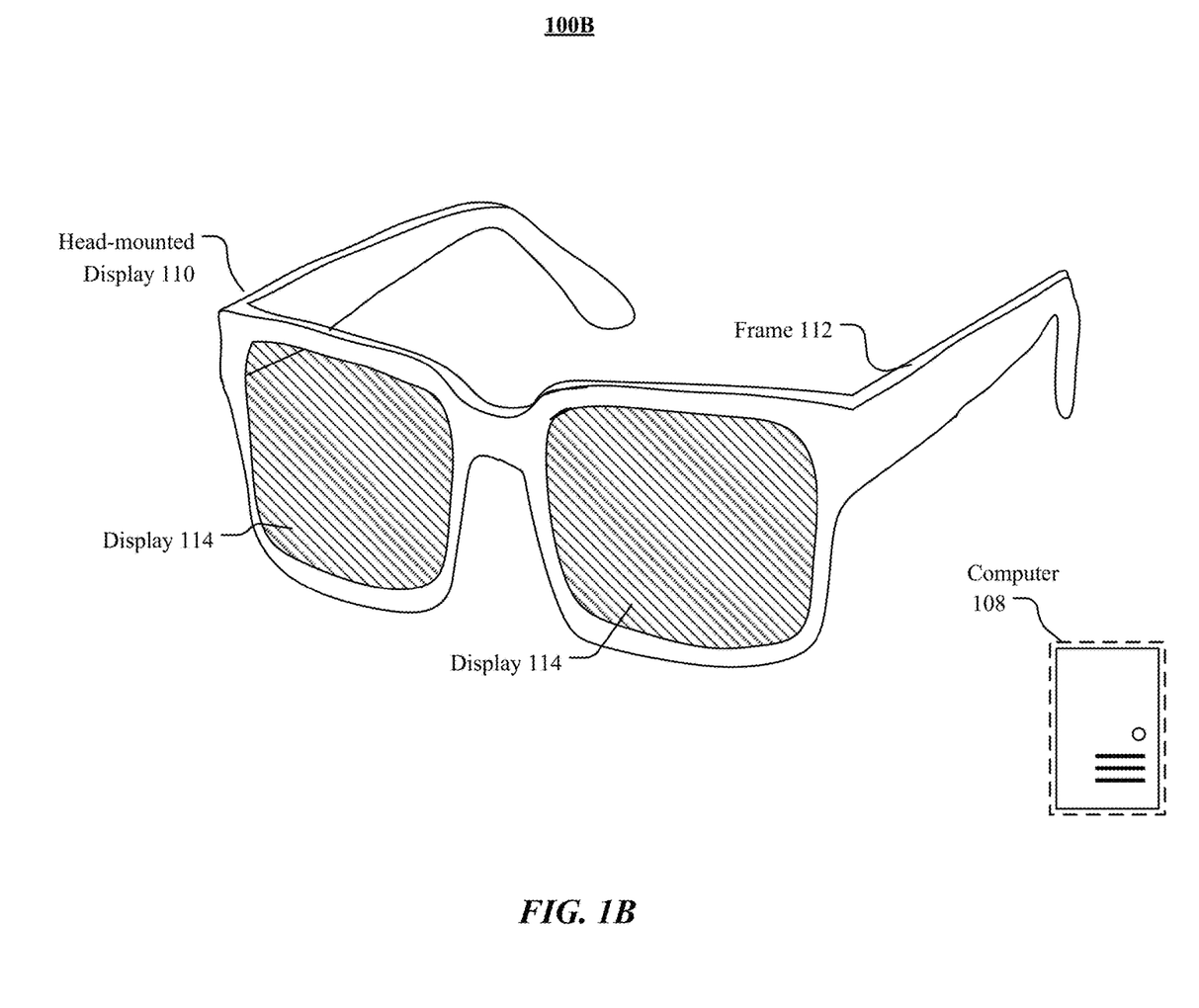
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing device 108. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The HMD 110 may include a microphone to capture voice input from the user. The augmented reality system 100B may further include a controller comprising a trackpad and one or more buttons. The controller may receive inputs from users and relay the inputs to the computing device 108. The controller may also provide haptic feedback to users. The computing device 108 may be connected to the HMD 110 and the controller through cables or wireless connections. The computing device 108 may control the HMD 110 and the controller to provide the augmented reality content to and receive inputs from users. The computing device 108 may be a standalone host computer device, an on-board computer device integrated with the HMD 110, a mobile device, or any other hardware platform capable of providing artificial reality content to and receiving inputs from users.

Figure 2:
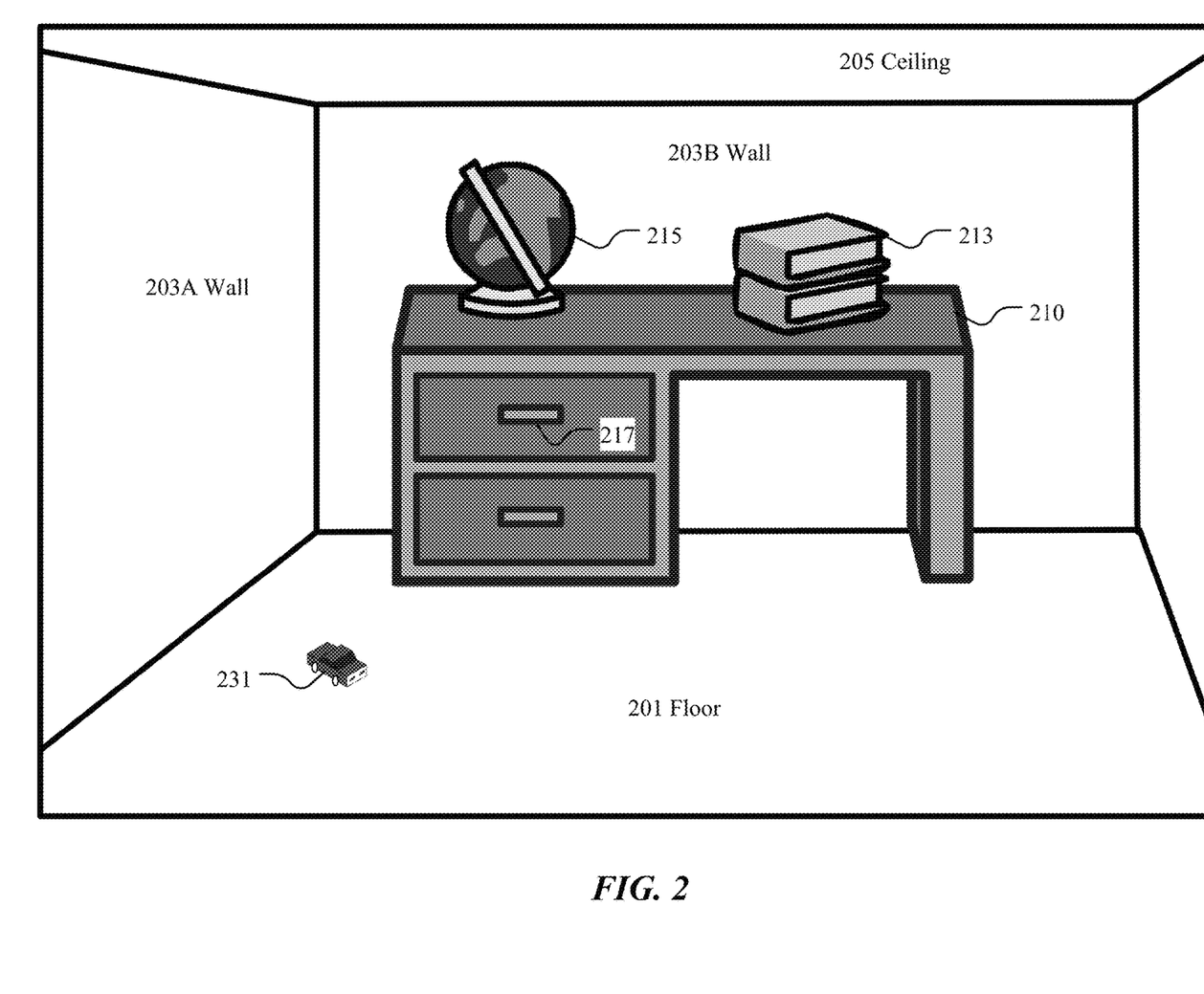
FIG. 2 illustrates an example augmented reality application in a room environment.

In particular embodiments, a computing device 108 may receive sensor data of a scene captured using one or more sensors. In particular embodiments, the sensor data may comprise image sensor data or depth sensor data. FIG. 2 illustrates an example augmented reality application in a room environment. As an example and not by way of limitation, illustrated in FIG. 2, a user is playing an augmented reality game using an augmented reality system 100B illustrated in FIG. 1B. In the augmented reality game, the user may control a virtual car 231 on surfaces in the room. The computing device 108 may receive image sensor data of the room captured by a camera sensor associated with the head-mounted display 110 and depth sensor data of the room captured by a depth sensor associated with the head-mounted display 110. In particular embodiments, the computing device 108 may receive any suitable additional sensor data of the room. Although this disclosure describes receiving sensor data of an environment in a particular manner, this disclosure contemplates receiving sensor data of an environment in any suitable manner.

In particular embodiments, the computing device 108 may generate a point cloud representing detected features of objects in the scene based on the sensor data. As an example and not by way of limitation, continuing with a prior example illustrated in FIG. 2, the computing device 108 may generate a point cloud representing detected features of objects in the room based on the image sensor data and the depth sensor data. In particular embodiments, the computing device 108 may utilize a plurality of images to generate the point cloud. The computing device 108 may also utilize the depth sensor data. Although this disclosure describes generating a point cloud representing detected features of objects in an environment in a particular manner, this disclosure contemplates generating a point cloud representing detected features of objects in an environment in any suitable manner.

In particular embodiments, the computing device 108 may also generate a plurality of virtual surfaces representing a plurality of detected planar surfaces in the scene based on the sensor data. To generate the plurality of virtual surfaces, the computing device 108 may detect a plurality of planar surfaces in the scene. In particular embodiments, the computing device 108 may perform a RANSAC based plane fitting method on the point cloud representing detected features of objects in the scene to detect the plurality of planar surfaces in the scene. In particular embodiments, the computing device 108 may run a machine-learning algorithm on the received sensor data to detect the plurality of planar surfaces in the scene. In particular embodiments, the computing device 108 may receive a user input indicating each of the plurality of planar surfaces in the scene to detect the plurality of planar surfaces in the scene. For example, a user may indicate a boundary of each planar surface in the scene using an interface device, such as a controller 106. Although this disclosure describes detecting a plurality of planar surfaces in an environment in a particular manner, this disclosure contemplates detecting a plurality of planar surfaces in an environment in any suitable manner.

In particular embodiments, the computing device 108 may select a subset of the plurality of planar surfaces satisfying one or more conditions. The one or more conditions may comprise a minimum required size of a planar surface, or a required orientation of a planar surface. The computing device 108 may generate a virtual surface for each planar surface in the subset of the plurality of planar surfaces. As an example and not by way of limitation, continuing with a prior example illustrated in FIG. 2, the computing device 108 may detect planar surfaces in the room by performing a RANSAC based plane fitting method on the point cloud representing detected features of objects in the room. The computing device 108 detects planar surfaces for a floor 201, walls, 203A and 203B, a ceiling 205, a desk top surface 210, a surface of a book 213, and a drawer handle 217 of the desk. Among the detected planar surfaces, the computing device 108 may select the planar surfaces for the floor 201, the walls 203A and 203B, the ceiling 205, and the desk top surface 210 because sizes of those surfaces exceed a threshold. In particular embodiments, the computing device may further apply one or more suitable conditions other than sizes of planar surfaces. The computing device 108 may generate virtual surfaces for the selected planar surfaces. As another example and not by way of limitation, continuing with a prior example illustrated in FIG. 2, the computing device 108 may detect planar surfaces in the room by running a machine-learning algorithm on the received sensor data. In particular embodiments, the machine-learning model may identify planar surfaces that satisfy the one or more conditions. In particular embodiments, the machine-learning model may identify all detectable planar surfaces in an environment. In such a case, the computing device 108 may select a subset of the identified planar surfaces that satisfy the one or more conditions. The computing device 108 may generate virtual surfaces for the selected subset of the identified planar surfaces. Although this disclosure describes generating virtual surfaces for planar surfaces that satisfy one or more conditions in a particular manner, this disclosure contemplates generating virtual surfaces for planar surfaces that satisfy one or more conditions in any suitable manner.

In particular embodiments, the computing device 108 may assign each point in the point cloud to one or more of the plurality of virtual surfaces. The computing device 108 may assign each point in the point cloud to a closest virtual surface. In particular embodiments, the computing device 108 may assign a point in the point cloud to more than one virtual surface when distances between the point and the virtual surfaces are within a threshold distance. Although this disclosure describes assigning a point in the point cloud to a virtual surface in a particular manner, this disclosure contemplates assigning a point in the point cloud to a virtual surface in any suitable manner.

Figure 3:
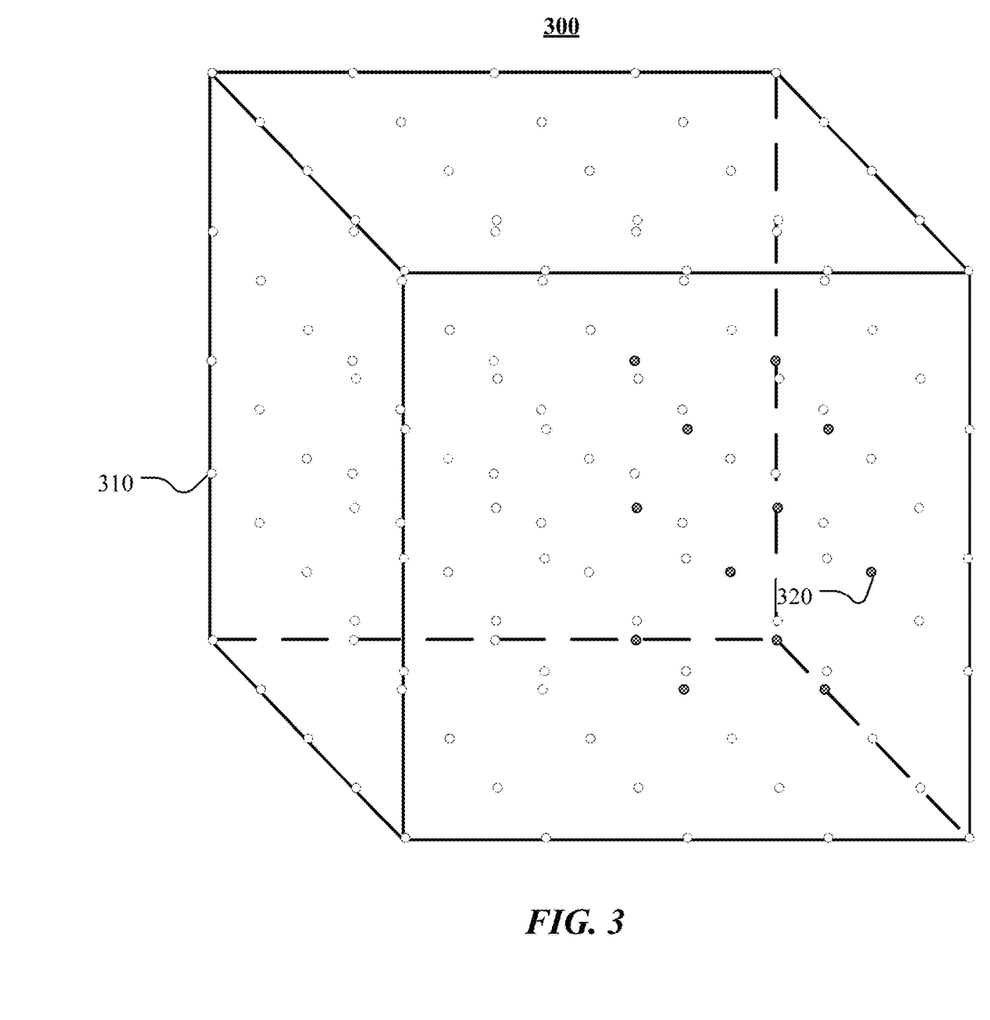
FIG. 3 illustrates an example block in a volume grid.

In particular embodiments, the computing device 108 may generate occupancy volumes for each of the plurality of virtual surfaces based on the points assigned to the virtual surface. The occupancy volumes may be defined relative to the virtual surface. To generate occupancy volumes for a virtual surface, the computing device 108 may determine a number of points in the point cloud that belongs to each block in a three-dimensional volume grid corresponding to a space on top of the virtual surface. The computing device 108 may generate occupancy volumes based on blocks determined to have more points in the point cloud than a threshold. In particular embodiments, the computing device 108 may generate occupancy volumes for each virtual surface by performing a Truncated Signed Distance Fields (TSDFs) fusion using a subset of points in the point cloud that are assigned to the virtual surface. FIG. 3 illustrates an example block in a volume grid. FIG. 3 illustrates only one block 300 among a plurality of blocks in a volume grid for a brevity purpose. Each block 300 may comprise N by N by N voxels. A voxel 310 may not correspond to a point in the point cloud while a voxel 320 may correspond to a point in the point cloud. The block 300 may be included into the occupancy volumes for the virtual surface if a number of voxels 320 corresponding to points in the point cloud exceeds a threshold. A density or a distribution of the voxels 320 corresponding to points in the point cloud among the voxels in the block may determine a resolution of extracted geometric properties. The details of the extracted geometric properties are described later. Although this disclosure describes generating occupancy volumes for each of the plurality of virtual surfaces in a particular manner, this disclosure contemplates generating occupancy volumes for each of the plurality of virtual surfaces in any suitable manner.

Figure 4:
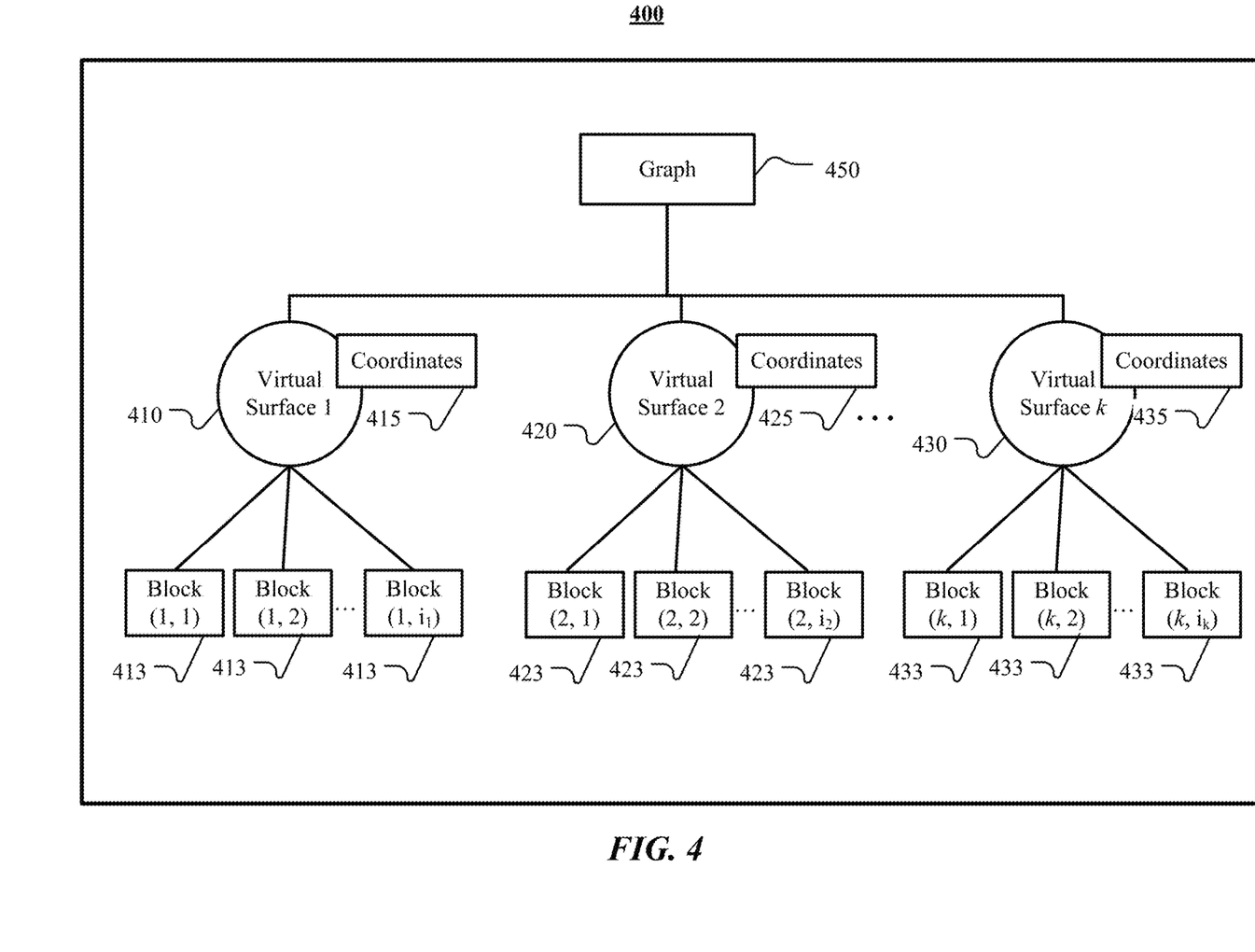
FIG. 4 illustrates an example logical structure for the datastore.

In particular embodiments, the computing device 108 may generate a datastore comprising the plurality of virtual surfaces, the occupancy volumes of each of the plurality of virtual surfaces, and a spatial relationship between the plurality of virtual surfaces. The spatial relationship between the plurality of virtual surfaces may be represented by a scene graph. In particular embodiments, the spatial relationship between the plurality of virtual surfaces may be represented by any suitable data structure including a graph. FIG. 4 illustrates an example logical structure for the datastore. A datastore 400 may comprise a plurality of virtual surfaces 410, 420, and 430. Each of the plurality of virtual surfaces 410, 420, 430 may be associated with one or more blocks 413, 423, and 433 representing occupancy volumes. The datastore 400 may also comprise a graph 450 representing spatial relationship between the plurality of virtual surfaces 410, 420, and 430. Although this disclosure describes generating a datastore comprising the plurality of virtual surfaces, the occupancy volumes of each of the plurality of virtual surfaces, and a spatial relationship between the plurality of virtual surfaces in a particular manner, this disclosure contemplates generating a datastore comprising the plurality of virtual surfaces, the occupancy volumes of each of the plurality of virtual surfaces, and a spatial relationship between the plurality of virtual surfaces in any suitable manner.

In particular embodiments, the datastore 400 may further comprise a spatial relationship of each of the plurality of virtual surfaces with a corresponding spatial anchor. As an example and not by way of limitation, the datastore 400 may comprise coordinates information 415, 425, and 435 for each of the plurality of virtual surfaces 410, 420, and 430. A coordinates for a virtual surface may represent a spatial relationship of the virtual surface with an origin of the coordinates system, a spatial anchor for the virtual surface. In particular embodiments, a spatial anchor for a virtual surface may be any suitable spatial anchor, and the spatial relationship between the virtual surface and its corresponding spatial anchor can be represented by any suitable data structure. Although this disclosure describes storing a spatial relationship of a virtual surface with a corresponding spatial anchor to the datastore in a particular manner, this disclosure contemplates storing a spatial relationship of a virtual surface with a corresponding spatial anchor to the datastore in any suitable manner.

In particular embodiments, the computing device 108 may receive a second sensor data of the scene captured using the one or more sensors. The computing device 108 may determine that a spatial relationship of a first virtual surface among the plurality of virtual surfaces with its corresponding spatial anchor in the datastore needs to be updated based on the second sensor data. The computing device 108 may update, in response to the determination, the spatial relationship of the first virtual surface with its corresponding spatial anchor in the datastore. An origin of occupancy volumes of a virtual surface may coincide with an origin of the virtual surface. Thus, positions of first occupancy volumes of the first virtual surface may be adjusted along with the first virtual surface. As an example and not by way of limitation, continuing with a prior example illustrated in FIG. 2, the computing device 108 may receive additional image sensor data and depth sensor data after the computing device 108 generates the datastore 400. Based on the additional sensor data, the computing device 108 may determine that coordinates information of a virtual surface corresponding to the desk top surface 210 in the datastore 400 needs to be updated. The computing device 108 may update the coordinates of the virtual surface corresponding to the desk top surface 210 in the datastore 400. Since occupancy volumes corresponding to the books 213 and the globe 215 are defined relative to the virtual surface corresponding to the desk top surface 210, spatial relationships of the occupancy volumes corresponding to the books 213 and the globe 215 to a spatial anchor are also adjusted. Although this disclosure describes updating a spatial relationship of a virtual surface with its corresponding spatial anchor in the datastore based on additional sensor data in a particular manner, this disclosure contemplates updating a spatial relationship of a virtual surface with its corresponding spatial anchor in the datastore based on additional sensor data in any suitable manner.

In particular embodiments, the computing device 108 may receive a query. The query may comprise one or more conditions for planar surfaces. The one or more conditions for the planar surfaces may comprise size of the planar surfaces, orientation of the planar surfaces, emptiness of the planar surfaces, or semantic information associated with occupancy volumes of virtual surfaces corresponding to the planar surfaces. As an example and not by way of limitation, continuing with a prior example illustrated in FIG. 2, the computing device 108 may receive a query for planar surfaces in the room from a module of the augmented reality game. Since the augmented reality game needs to run the car 231 on one of the planar surfaces in the room, the one or more conditions may comprise planar surfaces with horizontal orientation. As another example and not by way of limitation, the augmented reality game may want to find a surface with minimal obstacles for the car 231. Thus, the one or more conditions may comprise planar surfaces with less than 25% of area occupied by any volumes. As yet another example and not by way of limitation, the one or more conditions may comprise planar surfaces with sizes larger than a particular value. Although this disclosure describes receiving a query comprising one or more conditions for planar surfaces in a particular manner, this disclosure contemplates receiving a query comprising one or more conditions for planar surfaces in any suitable manner.

Figure 5:
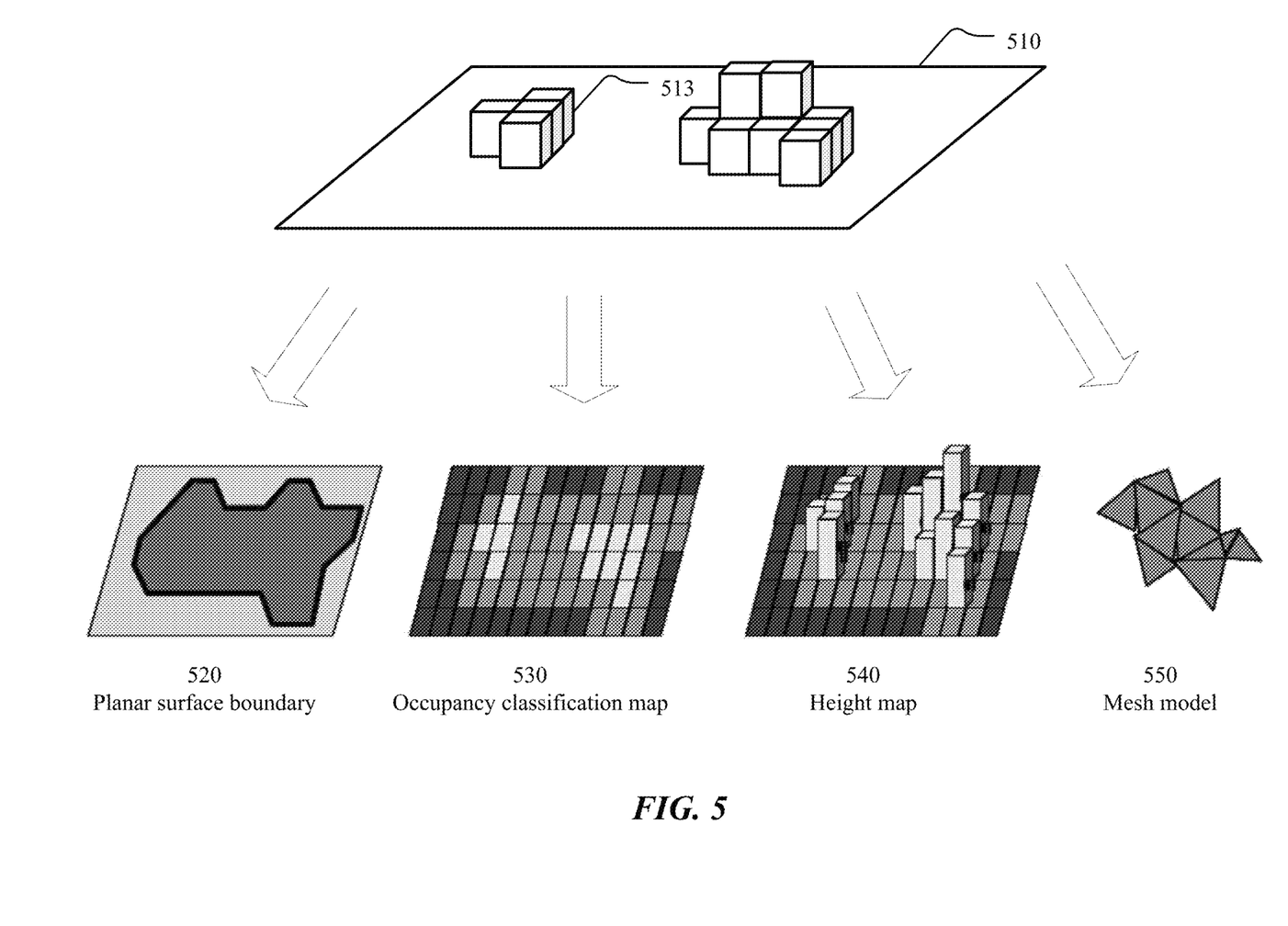
FIG. 5 illustrates example geometric properties extracted from a virtual surface and occupancy volumes.

In particular embodiments, the computing device 108 may identify a subset of the plurality of virtual surfaces in the datastore that satisfy the one or more conditions in the query. To identify the subset of the plurality of virtual surfaces in the datastore that satisfy the one or more conditions in the query, the computing device 108 may extract geometric properties of each of the plurality of virtual surfaces and occupancy volumes of each of the plurality of virtual surfaces in the datastore 400. The geometric properties may comprise a planar surface boundary map, an occupancy classification map, a height map, a three-dimensional mesh representation, or any suitable geometric properties. FIG. 5 illustrates example geometric properties extracted from a virtual surface and occupancy volumes. As an example and not by way of limitation, the computing device 108 may extract at least one of geometric properties 520, 530, 540, 550 of a virtual surface 510 and occupancy volumes 513 of the virtual surface 510. When an augmented reality application needs to plane a virtual object in a physically conforming manner, the one or more conditions in a query may comprise heights of occupancy volumes. In such a case, the computing device may extract a height map 540. When the one or more conditions in the query comprise sizes of the virtual surfaces, the computing device 108 may extract a planar surface boundary map 520. When the one or more conditions in the query comprise occupancy of the planar surfaces, the computing device 108 may extract an occupancy classification map 530. Since those geometric properties may be persisted, those geometric properties may be re-used for queries in a future. Although this disclosure describes identifying a subset of a plurality of virtual surfaces in the datastore that satisfy one or more conditions in a query in a particular manner, this disclosure contemplates identifying a subset of a plurality of virtual surfaces in the datastore that satisfy one or more conditions in a query in any suitable manner.

In particular embodiments, the computing device 108 may send a response to the query. The response may comprise an identified subset of the plurality of virtual surfaces in the datastore that satisfy the query. Although this disclosure describes sending a response to a query in a particular manner, this disclosure contemplates sending a response to a query in any suitable manner.

In particular embodiments, the computing device 108 may receive a third sensor data of the scene captured using the one or more sensors. The computing device 108 may generate a second virtual surface representing a detected planar surface in the scene based on the third sensor data, wherein the second virtual surface is not in the datastore 400. The computing device 108 may assign one or more points in the point cloud to the second virtual surface. The computing device 108 may generate second occupancy volumes for the second virtual surface based on the one or more points assigned to the second virtual surface. The computing device 108 may determine that the second occupancy volumes are identical to third occupancy volumes of a third virtual surface in the datastore 400. The computing device 108 may determine that the second occupancy volumes are closer to the second virtual surface than the third virtual surface. The computing device 108 may delete the third occupancy volumes from the datastore 400 in response to the determination the second occupancy volumes are closer to the second virtual surface than the third virtual surface. The computing device 108 may add the second virtual surface and the second occupancy volumes of the second virtual surface to the datastore 400. As an example and not by way of limitation, continuing with a prior example illustrated in FIG. 2, at an initial scanning, the computing device 108 did not detect the desk top surface 210. The occupancy volumes corresponding the books 213 and the globe 215 are associated with a virtual surface corresponding to the wall 203B because the wall 203B is closest detected planar surface to the books 213 and the globe 215. During a further scanning, the computing device 108 receives additional image sensor data and depth sensor data of the room. The computing device 108 detects the desk top surface 210 based on the received sensor data. The computing device 108 generates a virtual surface representing the detected desk top surface 210. The computing device 108 assigns points in the point cloud corresponding to the books 213 and the globe 215 to the virtual surface corresponding to the desk top surface 210. The computing device 108 generates occupancy volumes of the virtual surface corresponding to the desk top surface 210 based on the points assigned to the virtual surface. The computing device 108 may determine that the generated occupancy volumes corresponding to the books 213 and the globe 215 are identical to occupancy volumes associated with a virtual surface corresponding to the wall 203B. Since the generated occupancy volumes corresponding to the books 213 and the globe 215 are closer to the virtual surface corresponding the desk top surface 210 that the virtual surface corresponding to the wall 203B, the computing device 108 deletes the occupancy volumes corresponding to the books 213 and the globe 215 from the datastore 400. Then, the computing device 108 adds the virtual surface corresponding to the desk top surface 210 and the occupancy volumes corresponding to the books 213 and the globe 215 to the datastore 400. The occupancy volumes corresponding to the books 213 and the globe 215 are associated with the virtual surface corresponding to the desk top surface 210. Although this disclosure describes adding a virtual surface corresponding to a newly detected planar surface to the datastore in a particular manner, this disclosure contemplates adding a virtual surface corresponding to a newly detected planar surface to the datastore in any suitable manner.

In particular embodiments, the computing device 108 may receive a fourth sensor data of the scene captured using the one or more sensors. The computing device 108 may determine that a fourth virtual surface and a fifth virtual surface in the datastore 400 belong to a single planar surface based on the fourth sensor data. The computing device 108 may generate a sixth virtual surface by merging the fourth virtual surface and the fifth virtual surface. The computing device 108 may generate sixth occupancy volumes based on the points assigned to the sixth virtual surface. The computing device 108 may update the datastore by (1) replacing the fourth virtual surface and the fifth virtual surface with the sixth virtual surface and (2) replacing fourth occupancy volumes of the fourth virtual surface and fifth occupancy volumes of the fifth virtual surface with the sixth occupancy volumes of the sixth virtual surface. As an example and not by way of limitation, continuing with a prior example illustrated in FIG. 2, at an initial scanning, the computing device 108 falsely detects two planar surfaces for the desk top surface 210. The computing device 108 generates two virtual surfaces corresponding to the falsely detected two planar surfaces and generate occupancy volumes of each of the two virtual surfaces. During a further scanning, the computing device 108 receives additional image sensor data and depth sensor data of the room. Based on the additional sensor data, the computing device 108 determines that the two virtual surfaces corresponding to the falsely detected two planar surfaces in the datastore 400 belong to a single desk top surface 210. The computing device 108 generates a virtual surface corresponding to the desk top surface 210. In particular embodiments, the computing device 108 may merge the two virtual surfaces corresponding to the falsely detected two planar surfaces to generate a virtual surface corresponding to the desk top surface 210. The computing device 108 generates occupancy volumes of the newly generated virtual surface based on the points assigned to the virtual surface. The computing device 108 replaces the two virtual surfaces corresponding to the falsely detected two planar surfaces with the newly generated virtual surface. The computing device 108 also replaces occupancy volumes of the two virtual surfaces corresponding to the falsely detected two planar surfaces with generated occupancy volumes of the newly generated virtual surface corresponding to the desk top surface 210. Although this disclosure describes updating the datastore to fix errors in a particular manner, this disclosure contemplates updating the datastore to fix errors in any suitable manner.

Figure 6:
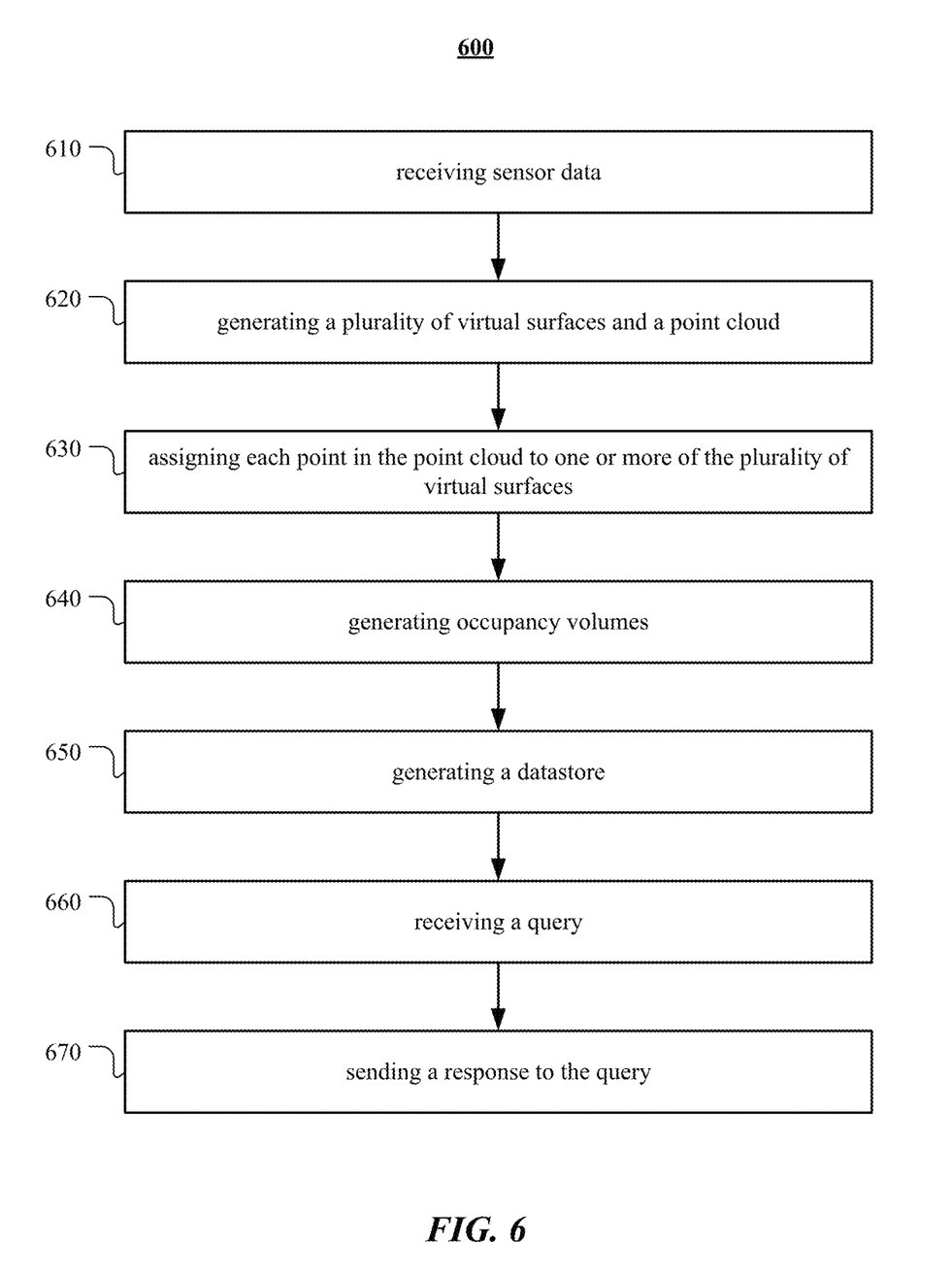
FIG. 6 illustrates an example method for modeling a scene using a plurality of virtual surfaces representing detected planar surfaces and per-surface occupancy volumes.

FIG. 6 illustrates an example method 600 for modeling a scene using a plurality of virtual surfaces representing detected planar surfaces and per-surface occupancy volumes. The method may begin at step 610, where the computing device 108 may receive sensor data of a scene captured using one or more sensors. At step 620, the computing device 108 may generate (1) a plurality of virtual surfaces representing a plurality of detected planar surfaces in the scene and (2) a point cloud representing detected features of objects in the scene based on the sensor data. At step 630, the computing device 108 may assign each point in the point cloud to one or more of the plurality of virtual surfaces. At step 640, the computing device 108 may generate occupancy volumes for each of the plurality of virtual surfaces based on the points assigned to the virtual surface. The occupancy volumes may be defined relative to the virtual surface. At step 650, the computing device 108 may generate a datastore comprising the plurality of virtual surfaces, the occupancy volumes of each of the plurality of virtual surfaces, and a spatial relationship between the plurality of virtual surfaces. At step 660, the computing device 108 may receive a query. At step 670, the computing device 108 may send a response to the query, The response may comprise an identified subset of the plurality of virtual surfaces in the datastore that satisfy the query. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for modeling a scene using a plurality of virtual surfaces representing detected planar surfaces and per-surface occupancy volumes including the particular steps of the method of FIG. 6, this disclosure contemplates any suitable method for modeling a scene using a plurality of virtual surfaces representing detected planar surfaces and per-surface occupancy volumes including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
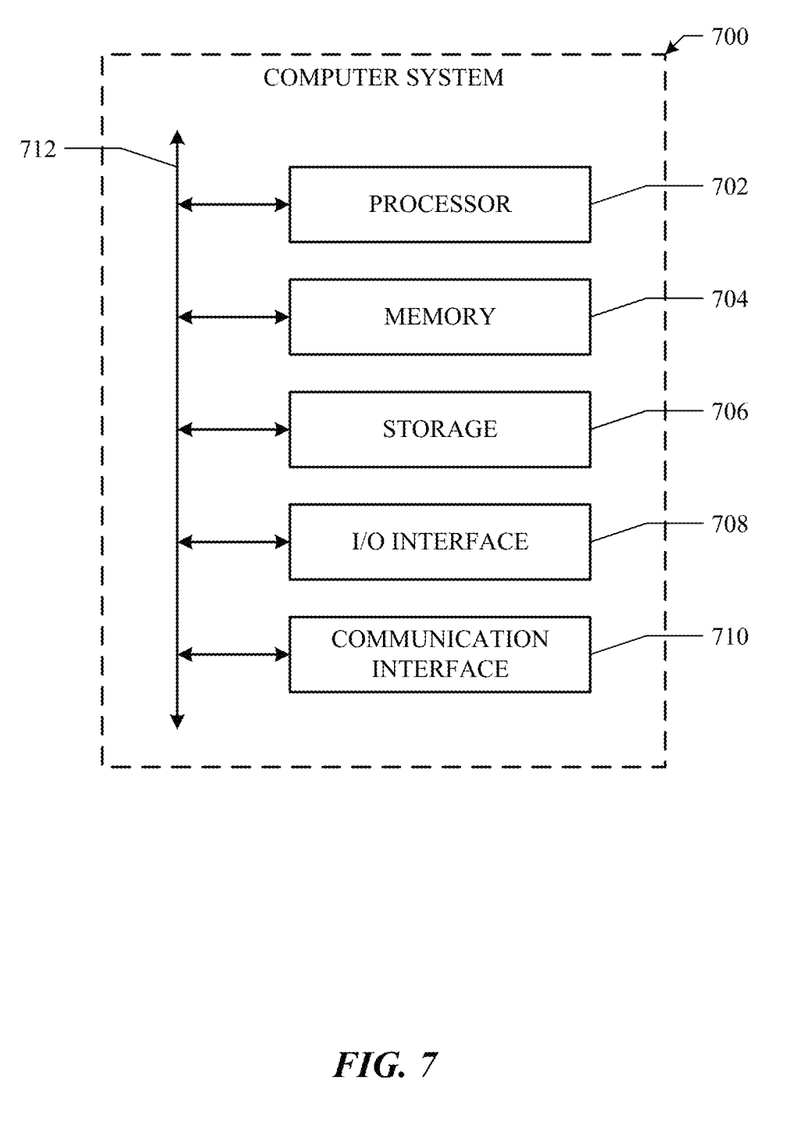
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
   receiving sensor data of a scene captured using one or more sensors;
   generating, based on the sensor data, (1) a plurality of virtual surfaces representing a plurality of detected planar surfaces in the scene and (2) a point cloud representing detected features of objects in the scene;
   assigning each point in the point cloud to one or more of the plurality of virtual surfaces;
   generating, for each of the plurality of virtual surfaces, occupancy volumes based on the points assigned to the virtual surface, the occupancy volumes being defined relative to the virtual surface;
   generating a datastore comprising the plurality of virtual surfaces, the occupancy volumes of each of the plurality of virtual surfaces, and a spatial relationship between the plurality of virtual surfaces;
   receiving a query; and
   sending a response to the query, the response comprising an identified subset of the plurality of virtual surfaces in the datastore that satisfy the query.

2. The method of claim 1, wherein generating the plurality of virtual surfaces comprises:
   detecting a plurality of planar surfaces in the scene;
   selecting a subset of the plurality of planar surfaces satisfying one or more conditions; and
   generating, for each planar surface in the subset of the plurality of planar surfaces, a virtual surface.

3. The method of claim 2, wherein detecting the plurality of planar surfaces in the scene comprises performing a RANdom SAmple Consensus (RANSAC) based plane fitting method on the point cloud representing detected features of objects in the scene.

4. The method of claim 2, wherein detecting the plurality of planar surfaces in the scene comprises running a machine-learning algorithm on the received sensor data.

5. The method of claim 2, wherein detecting the plurality of planar surfaces in the scene comprises receiving a user input indicating each of the plurality of planar surfaces in the scene.

6. The method of claim 2, wherein the one or more conditions comprise a minimum required size of a planar surface, or a required orientation of a planar surface.

7. The method of claim 1, wherein generating occupancy volumes for each of the plurality of virtual surfaces comprises:
   determining, for each block in a three-dimensional volume grid corresponding to a space on top of the virtual surface, a number of points in the point cloud that belongs to the block; and
   generating occupancy volumes based on blocks determined to have more points in the point cloud than a threshold.

8. The method of claim 1, wherein generating occupancy volumes for each of the plurality of virtual surfaces comprises:
   performing a Truncated Signed Distance Fields (TSDF) fusion using a subset of points assigned to the virtual surface.

9. The method of claim 1, wherein an origin of occupancy volumes of a virtual surface coincides with an origin of the virtual surface.

10. The method of claim 1, wherein the datastore further comprises a spatial relationship of each of the plurality of virtual surfaces with a corresponding spatial anchor.

11. The method of claim 10, further comprising:
receiving a second sensor data of the scene captured using the one or more sensors;
determining, based on the second sensor data, that a spatial relationship of a first virtual surface among the plurality of virtual surfaces with its corresponding spatial anchor in the datastore needs to be updated; and
updating, in response to the determination, the spatial relationship of the first virtual surface with its corresponding spatial anchor in the datastore.

12. The method of claim 11, wherein positions of first occupancy volumes of the first virtual surface is adjusted along with the first virtual surface.

13. The method of claim 1, wherein the query comprises one or more conditions for planar surfaces.

14. The method of claim 13, wherein the one or more conditions for the planar surfaces comprise size of the planar surfaces, orientation of the planar surfaces, emptiness of the planar surfaces, or semantic information associated with occupancy volumes of virtual surfaces corresponding to the planar surfaces.

15. The method of claim 1, wherein the subset of the plurality of virtual surfaces in the datastore that satisfy the query is identified by extracting geometric properties of occupancy volumes of each of the plurality of virtual surfaces in the datastore.

16. The method of claim 15, wherein the geometric properties comprise a planar surface boundary map, an occupancy classification map, a height map, or a three-dimensional mesh representation.

17. The method of claim 1, further comprising:
receiving a third sensor data of the scene captured using the one or more sensors;
generating, based on the third sensor data, a second virtual surface representing a detected planar surface in the scene, wherein the second virtual surface is not in the datastore;
assigning one or more points in the point cloud to the second virtual surface;
generating second occupancy volumes for the second virtual surface based on the one or more points assigned to the second virtual surface;
determining the second occupancy volumes are identical to third occupancy volumes of a third virtual surface in the datastore;
determining that the second occupancy volumes are closer to the second virtual surface than the third virtual surface;
deleting, in response to the determination the second occupancy volumes are closer to the second virtual surface than the third virtual surface, the third occupancy volumes from the datastore; and
adding the second virtual surface and the second occupancy volumes of the second virtual surface to the datastore.

18. The method of claim 1, further comprising:
receiving a fourth sensor data of the scene captured using the one or more sensors;
determining, based on the fourth sensor data, that a fourth virtual surface and a fifth virtual surface in the datastore belong to a single planar surface;
generating a sixth virtual surface by merging the fourth virtual surface and the fifth virtual surface;
generating sixth occupancy volumes based on the points assigned to the sixth virtual surface; and
updating the datastore by (1) replacing the fourth virtual surface and the fifth virtual surface with the sixth virtual surface and (2) replacing fourth occupancy volumes of the fourth virtual surface and fifth occupancy volumes of the fifth virtual surface with the sixth occupancy volumes of the sixth virtual surface.

19. One or more computer-readable non-transitory storage media embodying software that is operable when executed to:
receive sensor data of a scene captured using one or more sensors;
generate, based on the sensor data, (1) a plurality of virtual surfaces representing a plurality of detected planar surfaces in the scene and (2) a point cloud representing detected features of objects in the scene;
assign each point in the point cloud to one or more of the plurality of virtual surfaces;
generate, for each of the plurality of virtual surfaces, occupancy volumes based on the points assigned to the virtual surface, the occupancy volumes being defined relative to the virtual surface;
generate a datastore comprising the plurality of virtual surfaces, the occupancy volumes of each of the plurality of virtual surfaces, and a spatial relationship between the plurality of virtual surfaces;
receive a query; and
send a response to the query, the response comprising an identified subset of the plurality of virtual surfaces in the datastore that satisfy the query.

20. A system comprising: one or more processors; and a non-transitory memory coupled to the processors comprising instructions executable by the processors, the processors operable when executing the instructions to:
receive sensor data of a scene captured using one or more sensors;
generate, based on the sensor data, (1) a plurality of virtual surfaces representing a plurality of detected planar surfaces in the scene and (2) a point cloud representing detected features of objects in the scene;
assign each point in the point cloud to one or more of the plurality of virtual surfaces;
generate, for each of the plurality of virtual surfaces, occupancy volumes based on the points assigned to the virtual surface, the occupancy volumes being defined relative to the virtual surface;
generate a datastore comprising the plurality of virtual surfaces, the occupancy volumes of each of the plurality of virtual surfaces, and a spatial relationship between the plurality of virtual surfaces;
receive a query; and
send a response to the query, the response comprising an identified subset of the plurality of virtual surfaces in the datastore that satisfy the query.

* * * * *